United States Patent
Park et al.

(10) Patent No.: US 10,312,021 B2
(45) Date of Patent: Jun. 4, 2019

(54) DIELECTRIC COMPOSITION AND MULTILAYER CERAMIC CAPACITOR HAVING THE SAME

(71) Applicants: SAMSUNG ELECTRO-MECHANICS CO., LTD., Suwon-Si, Gyeonggi-Do (KR); KOREA ADVANCED INSTITUTE OF SCIENCE & TECHNOLOGY, Daejeon (KR)

(72) Inventors: Kum Jin Park, Suwon-Si (KR); Chang Yeon Baek, Pyeongtaek-Si (KR); Ji Eun Wang, Daejeon (KR); Do Kyung Kim, Daejeon (KR)

(73) Assignees: Samsung Electro-Mechanics Co., Ltd., Suwon-si, Gyeonggi-do (KR); Korea Advanced Institute of Science and Technology, Daejon-si (KR)

( * ) Notice: Subject to any disclaimer, the term of this patent is extended or adjusted under 35 U.S.C. 154(b) by 9 days.

(21) Appl. No.: 15/676,481

(22) Filed: Aug. 14, 2017

(65) Prior Publication Data

US 2018/0182548 A1 Jun. 28, 2018

(30) Foreign Application Priority Data

Dec. 22, 2016 (KR) .................. 10-2016-0177113

(51) Int. Cl.
*H01G 4/30* (2006.01)
*H01G 4/06* (2006.01)
(Continued)

(52) U.S. Cl.
CPC ......... *H01G 4/1218* (2013.01); *C01G 23/006* (2013.01); *H01G 4/248* (2013.01); *H01G 4/30* (2013.01); *C01P 2004/03* (2013.01); *C01P 2004/10* (2013.01); *C01P 2004/17* (2013.01); *C01P 2004/24* (2013.01); *C01P 2004/54* (2013.01)

(58) Field of Classification Search
CPC ........ H01G 4/30; H01G 4/232; H01G 4/1218; H01G 4/248; H01G 4/018; H01G 4/06; H01G 4/12
USPC ............. 361/321.1, 321.2, 301.4, 311, 321.4
See application file for complete search history.

(56) References Cited

U.S. PATENT DOCUMENTS

2002/0141139 A1   10/2002  Nakamura et al.
2012/0327555 A1*  12/2012  Ahn .................. H01G 4/30
                                              361/321.1
(Continued)

FOREIGN PATENT DOCUMENTS

EP       2055676 A2    5/2009
JP    2007-176789 A    7/2007
(Continued)

*Primary Examiner* — Eric W Thomas
*Assistant Examiner* — Arun Ramaswamy
(74) *Attorney, Agent, or Firm* — Morgan, Lewis & Bockius LLP (57) ABSTRACT

A dielectric composition is a barium titanate-based dielectric composition and includes a barium titanate particle including a major axis, a minor axis disposed on the same plane as the major axis, and a vertical axis perpendicular to both the major axis and the minor axis, and a ratio of a length of the major axis to a length of the vertical axis is within a range from 1.5:1 to 30:1.

16 Claims, 4 Drawing Sheets

(51) Int. Cl.
*H01G 4/018* (2006.01)
*H01G 4/12* (2006.01)
*H01G 4/248* (2006.01)
*C01G 23/00* (2006.01)

(56) References Cited

U.S. PATENT DOCUMENTS

2012/0328878 A1* 12/2012 Karaki ................. C01G 33/006
428/402
2017/0025222 A1 1/2017 Park et al.

FOREIGN PATENT DOCUMENTS

| | | |
|---|---|---|
| KR | 10-1999-0075846 A | 10/1999 |
| KR | 10-2002-0064152 A | 8/2002 |
| KR | 10-2009-0046716 A | 5/2009 |
| KR | 10-2017-0012686 A | 2/2017 |

* cited by examiner

DIELECTRIC COMPOSITION AND MULTILAYER CERAMIC CAPACITOR HAVING THE SAME

CROSS-REFERENCE TO RELATED APPLICATION(S)

This application claims the benefit of priority to Korean Patent Application No. 10-2016-0177113, filed on Dec. 22, 2016 in the Korean Intellectual Property Office, the disclosure of which is incorporated herein by reference in its entirety.

BACKGROUND

1. Field

The present disclosure relates to a dielectric composition and a multilayer ceramic capacitor (MLCC) having the same and, more particularly, to a barium titanate dielectric powder suitable for super-high capacity, and an MLCC having the same.

2. Description of Related Art

Electronic components using ceramic materials, such as a capacitor, an inductor, a piezoelectric element, a varistor, a thermistor, and the like, include a ceramic body formed of the ceramic material, internal electrodes formed in the ceramic body, and external electrodes installed on a surface of the ceramic body so as to be connected to the internal electrodes.

Among the electronic components, a multilayer ceramic capacitor is generally manufactured by laminating internal electrode pastes and dielectric layer pastes by a sheet method, a printing method, or the like, and then firing these pastes.

As the dielectric material used for existing multilayer ceramic capacitors, a dielectric material based on barium titanate ($BaTiO_3$) has been used.

As many functions of components requiring high reliability are digitalized and the demand for the components has increased, the multilayer ceramic electronic components have also required characteristics such as high capacity and high reliability.

Korean Patent Laid-Open Publication No. 10-1999-0075846 tries to control the components and content of compositions to a specific numerical range, to ensure high dielectric characteristics, but may not prevent permittivity from deteriorating because a dielectric material is formed of particles, according to the need for micro-miniaturization and ultra thinness of the MLCC.

SUMMARY

An aspect of the present disclosure may provide a dielectric composition exhibiting a high permittivity and a multilayer ceramic capacitor having the same.

According to an aspect of the present disclosure, a dielectric composition may be a barium titanate-based dielectric composition and may include a barium titanate particle including a major axis, a minor axis disposed on the same plane as the major axis, and a vertical axis perpendicular to both the major axis and the minor axis and having a ratio of a length of the major axis to a length of the vertical axis that ranges from 1.5:1 or greater to 30:1 or less.

According to another aspect of the present disclosure, a multilayer ceramic capacitor may include: a body having a stacked structure in which a plurality of dielectric sheets are stacked; and external electrodes disposed on an outer surface of the body, in which each sheet in the body may include a dielectric grain of a dielectric composition and the grain may include a major axis, a minor axis disposed on the same plane as the major axis, and a vertical axis perpendicular to both the major axis and the minor axis and have a ratio of a length of the vertical axis to a length of the major axis that ranges from 2:1 or greater to 30:1 or less.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Hereinafter, a dielectric composition and a multilayer ceramic capacitor according to an exemplary embodiment in the present disclosure will be described, but the present disclosure is not necessarily limited thereto.

Figure 1:
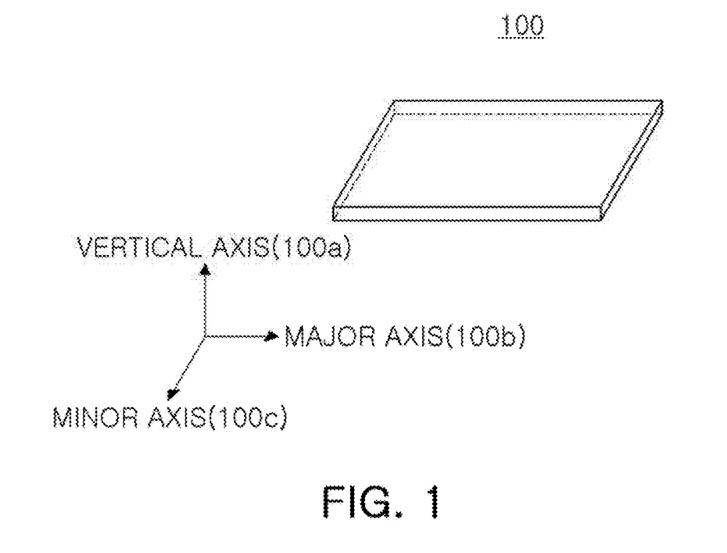
FIG. 1 is a schematic perspective view of a dielectric composition according to an exemplary embodiment in the present disclosure.

FIG. 1 is a schematic perspective view of a dielectric composition according to an exemplary embodiment in the present disclosure.

Referring to FIG. 1, a dielectric composition 100 according to one example of the present disclosure may be a barium titanate-based dielectric composition. Here, the barium titanate ($BaTiO_3$)-based dielectric composition may be understood as including a pure barium titanate or a compound in which a Ba site (A site) and a Ti site (B site) of the barium titanate are doped with other additive elements. A method for forming a barium titanate-based dielectric composition may not be limited. For example, an aqueous solution of $TiCl_4$ may be added while an aqueous solution of $BaCl_2 \cdot 2H_2O$ is agitated. In this case, a molar concentration of a Ba precursor aqueous solution may be appropriately controlled, but it may be preferable that a molar ratio between a Ba composition and a Ti composition in a mixed aqueous solution is controlled within the range of 1.05:1 or greater to 6:1 or less. The reason is that if the molar ratio is smaller than 1.05:1, control ability of the barium titanate may remarkably deteriorate and if the molar ratio is larger than 6:1, undesirable secondary phases such as $BaCO_3$ may be formed in the dielectric composition. Next, the mixed aqueous solution may be added with distilled water, ethylene glycol, and sodium hydroxide solution, and then agitated. Thereafter, the agitated solution may be subjected to hydrothermal synthesis at about 150° C. to 300° C. for about 1 to 96 hours. In the synthesis process, a concentration of ion and a kind of solvents added during the synthesis operation may be appropriately controlled to synthesize a powder. In this way, the synthesized powder may be dried to obtain a final barium titanate particle.

The final barium titanate particle may have a three-dimensional shape and may include a major axis 100b, a minor axis 100c formed on the same plane as the major axis, and a vertical axis 100a simultaneously perpendicular to the major axis and the minor axis. In this case, the major axis means a central axis of a direction extending in the longest length in plate-shaped or ribbon-shaped barium titanate particle.

Preferably, a ratio of a length of the vertical axis to a length of the major axis may range from 1.5 or greater and 30 or less. If the ratio of the length of the major axis to the length of the vertical axis is less than 1.5, the plate-shaped or ribbon-shaped barium titanate particle has little difference in shape from a spherical barium titanate particle and therefore has a limitation in increasing capacity and if the ratio of the length of the major axis to the length of the vertical axis is greater than 30, the plate-shaped or ribbon-shaped barium titanate particle may extend longer in the major axis than in the vertical axis and therefore have the technical limitation and the greatly reduced molding possibility.

In the final barium titanate, the ratio of the length of the major axis to the length of the minor axis may be within a range from 1:1 or greater to 30:1 or less. If the ratio of the length of the major axis and the length of the minor is smaller than 1:1, the concept of the major axis and minor axis is opposed to each other and if the ratio of the length of the major axis and the length of the minor is larger than 30:1, there may be a problem that the molding reliability of the barium titanate particle satisfying the ratio may be reduced.

Further, the barium titanate particle may satisfy the ratio of the length between the major axis and the vertical axis and the ratio of the length between the major axis and the minor axis. In the final barium titanate particle, the length of the minor axis 100c may be within a range from 20 nm to 500 nm, the length of the major axis 100b may be within a range from 50 nm to 2000 nm, and the length of the vertical axis 100a may be within a range from 10 nm to 200 nm.

The technical reason is that if the length of the minor axis 100c is shorter than 20 nm, the permittivity may be reduced and if the length of the minor axis 100c is larger than 500 nm, reliability characteristics such as IR characteristics and BDV characteristics may be lowered. Further, the technical reason is that if the length of the major axis 100b is shorter than 50 nm, the permittivity may be reduced and if the length of the major axis 100b is larger than 2000 nm, the reliability characteristics, such as the IR characteristics and the BDV characteristics, may be lowered. If the length of the vertical axis 100a is less than 10 nm, the process control such as dispersion may be extremely difficult and if the length of the vertical axis 100a is larger than 200 nm, DC bias characteristics and reliability characteristics may be lowered.

Next, FIGS. 2A through 2D are SEM photographs of a particle powder of the dielectric composition according to the example in the present disclosure.

Figure 2A:
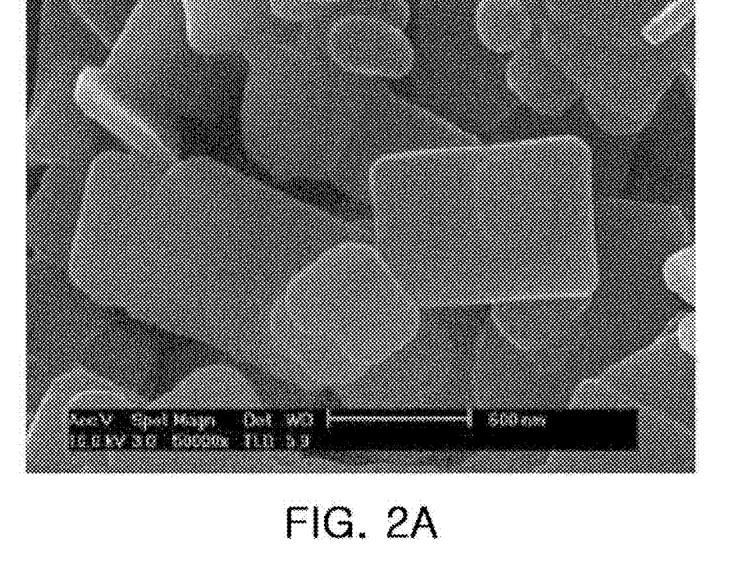
FIGS. 2A through 2D are SEM photographs of a particle powder of the dielectric composition according to the exemplary embodiment in the present disclosure.
Figure 2B:
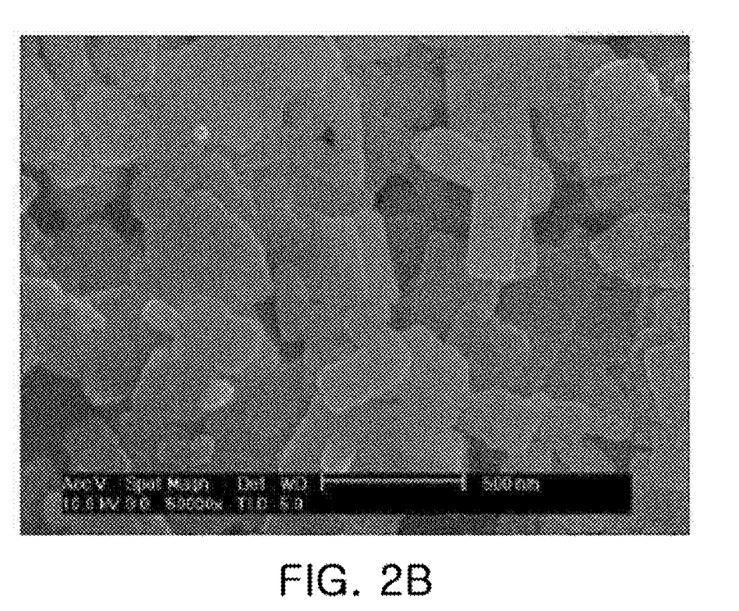

In FIGS. 2A and 2B, the barium titanate may have a shape including a minor axis having a length within a range from 100 nm to 300 nm, a major axis having a length within a range from 200 nm to 500 nm, and a vertical axis having a length within a range from 20 nm to 80 nm, on average and therefore may be formed of substantially the plate-shaped particle.

Figure 2C:
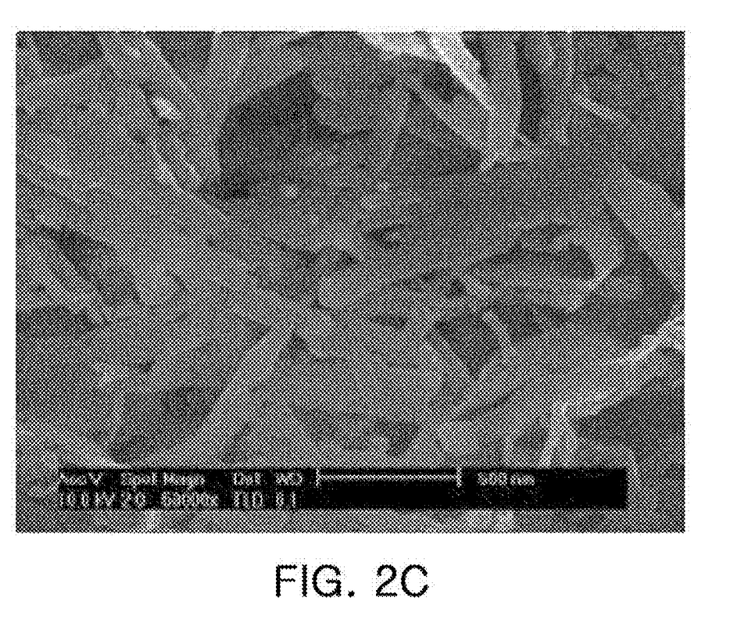
Figure 2D:
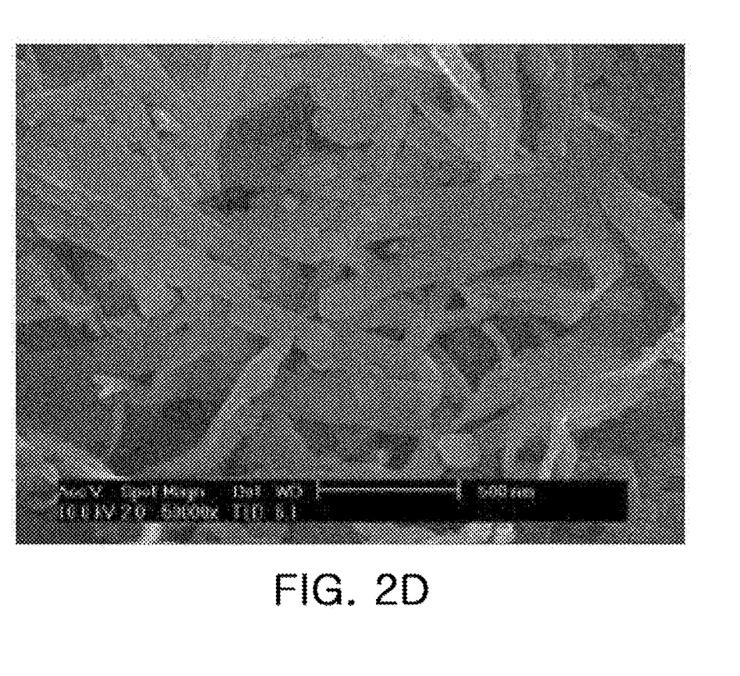

In FIGS. 2C and 2D, the barium titanate may have a shape including a minor axis having a length within a range from 50 nm to 300 nm, a major axis having a length within a range from 200 nm to 500 nm, and a vertical axis having a length of less than 20 nm, on average and therefore may be formed of substantially the ribbon-shaped particle.

Figure 3:
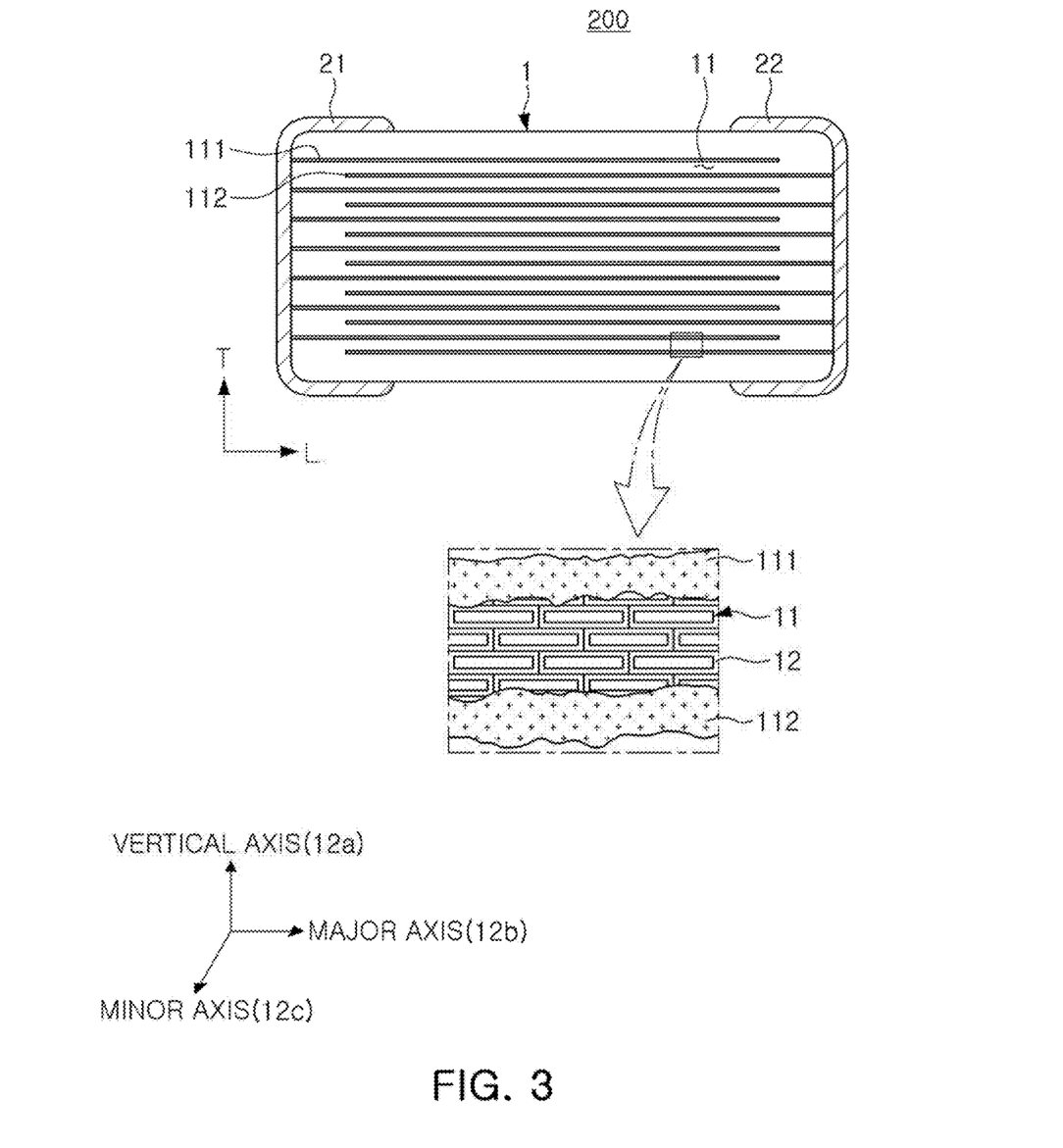
FIG. 3 is a schematic cross-sectional view of a multilayer ceramic capacitor according to another exemplary embodiment in the present disclosure.

FIG. 3 is a schematic cross-sectional view of a multilayer ceramic capacitor according to another example in the present disclosure. Referring to FIG. 3, the multilayer ceramic capacitor 200 may include a body 1 having a stacked structure in which a plurality of dielectric sheets are stacked and first and second external electrodes 21 and 22 disposed on an outer surface of the body 1.

The body 1 may have substantially a hexahedron shape including an upper surface and a lower surface facing each other in a thickness (T) direction, a first end surface and a second end surface facing each other in a length (L) direction, and a first end surface and a second end surface facing each other in a width (W) direction, but is not limited thereto.

A first internal electrode 111 connected to the first external electrode 21 may be printed on the dielectric sheet and a second internal electrode 112 connected to the second external electrode 22 may be printed on the dielectric sheet different from that of the first internal electrode. The first internal electrode and the second internal electrode may be alternately stacked in the thickness direction of the body and may be electrically insulated from each other.

The first and second internal electrodes may be disposed to have an appropriate thickness and the number of layers depending on applications. The thickness of each of the first and second internal electrodes may mean a length extending in parallel with the thickness direction of the body.

The first and second internal electrodes may include a conductive material. For example, the conductive metal may include nickel (Ni), copper (Cu), palladium (Pd), or an alloy thereof, but is not limited thereto.

The first internal electrode 111 or the second internal electrode 112 may include an inhibitor that is trapped therein. An area of the inhibitor trapped in the first or second internal electrode may be maintained within a range from 3% to 20% with respect to that of the first or second internal electrode. If the area of the inhibitor trapped in the first or second internal electrode is less than 3% with respect to that of the first or second internal electrode, the inhibitor to reduce the occurrence in deterioration of the insulation by suppressing an overcurrent from flowing in the internal electrode and preventing the electrode from being agglomerated and broken even if the internal electrode is overheated may insufficiently work and if the area of the inhibitor is larger than 20%, a non-conductive area in the internal electrode may be increased, such that the connectivity of the internal electrode may deteriorate and the capacity may be lowered.

To control the area of the inhibitor trapped in the first or second internal electrode to the numerical range, the barium titanate ($BaTiO_3$) included in the internal electrode paste as the inhibitor may be pushed out toward an interface between the internal electrode and the dielectric sheet adjacent thereto depending on the sintering of the internal electrode by rapidly increasing a temperature in a firing temperature range during a firing process for forming the body, and then the barium titanate powder pushed out toward the interface between the internal electrode and the dielectric sheet may be prevented from being diffused toward the central portion of the dielectric sheet by rapidly sintering the ceramic green sheet configuring the dielectric sheet after the barium titanate powder is pushed out.

On the other hand, the inhibitor may be a dielectric material of the barium titanate and a barium titanate-based dielectric material doped with an additive. Therefore, as compared to the case where the pure barium titanate dielectric is used as the inhibitor, the reduction resistance of the inhibitor may be more improved and the insulating property of the inhibitor after the firing may be more improved. For example, the additive may be at least one element selected from the group consisting of calcium (Ca), a valence acceptor element, and a rare earth element, in which the valence acceptor element may include at least one of magnesium (Mg) and manganese (Mn) and the rare earth element may include at least one of yttrium (Y), gadolinium (Gd), and dysprosium (Dy).

Next, the plurality of dielectric sheets 11 configuring the stacked structure of the body together with the internal electrodes will be described.

In order to describe the dielectric sheet, the process of forming a body having a stacked structure will be described first. First, the dielectric compositions 100 according to an example in the present disclosure described above may be used as a raw material powder and a sintering agent, a binder, and an organic solvent such as an ethanol may be added and wet-mixed to prepare slurry. Thereafter, the slurry may be applied and dried on a carrier film by a shearing force to form a ceramic green sheet so that the major axis of the dielectric compositions may be aligned in one direction. Next, after the internal electrode paste is printed on the ceramic green sheet, a plurality of ceramic green sheets on which the internal electrode pattern is formed may be stacked to form a laminate, and then the laminate may be compressed and cut. Subsequently, the cut laminate may be heated to remove the binder and fired under the high temperature reduction atmosphere to produce a final MLCC chip.

In this case, in the final MLCC chip, each of the plurality of dielectric sheets 11 stacked along the stacking direction may include grains 12 of a plurality of dielectric compositions configured of a plurality of layers. A vertical axis 12a of the grain 12 of the dielectric composition is aligned in parallel with the stacking direction, and a length of the vertical axis may be preferably 100 nm or less. If the length of the vertical axis is larger than 100 nm, the DC bias characteristics and the reliability may be lowered, which may not be preferable.

Meanwhile, the grain 12 may further include a major axis 12b and a minor axis 12c perpendicular to the vertical axis, in which the major axis and the minor axis may be placed on the same plane.

In this case, a ratio of a length of the vertical axis 12a to a length of the major axis 12b may be within a range from 2 to 100. If the ratio of the length of the vertical axis to the length of the major axis is smaller than 2, the length of the vertical axis may not be reduced sufficiently, such that the IR deterioration may be highly likely to occur. On the other hand, if the ratio of the length of the vertical axis to the length of the major axis is larger than 100, there is a high possibility that a large area may not be sufficiently secured on the major axis, such that there may be a limitation in securing the high capacity.

Controlling the ratio of the length of the major axis to the length of the vertical axis to the numerical value range may mean that the length of the vertical axis aligned in the stacking direction is larger than the length of the major axis having a relatively long length. This may increase the area of the dielectric grain to increase the permittivity and reduce the length in the stacking direction, such that the dielectric grain may not be restricted by electric field and the permittivity may be prevented from being reduced even in a high electric field. Further, since the size is reduced in the stacking direction, the movement of electrons may be suppressed, such that the reliability may be greatly improved.

In general, if the size of the dielectric grain is large, the capacity may be increased at a low voltage but the capacity may be reduced at a high voltage, the DC bias characteristics may deteriorate, and IR deterioration phenomenon may occur. On the other hand, if the size of the dielectric grain is small, the reliability may be improved but the capacity may be lowered. However, the thinner the MLCC, the higher the voltage applied to the dielectric, and therefore the DC bias characteristics may become important. The multilayer ceramic electronic component of the present disclosure may be relatively less affected by the voltage while increasing the permittivity by making the area of the grain in the dielectric sheet large and the thickness of the grain thin, such that the high permittivity may be ensured even at a high voltage.

Specifically, the following Table 1 may show electrical characteristics between the multilayer ceramic capacitor (Comparative Example 1) manufactured by using the spherical dielectric composition in the dielectric sheet and the multilayer ceramic capacitor (Inventive Example 1) according to the example in the present disclosure manufactured by using the plate-shaped dielectric composition.

In the following Table 1, the permittivity may mean permittivity at room temperature, and the permittivity at room temperature and the change rate of capacity (DC-bias) were measured by Agilent 4284A under the conditions of 1 kHz and 1 V. A break-down voltage (BDV) was measured by a Keithely measurer, and a voltage value in the moment in which a current value becomes 10 mA by applying a voltage by 1.00000V from 0V in a sweep scheme was measured as a BDV value.

TABLE 1

| Sample | Permittivity | Change rate of capacity (DC-bias) | BDV |
| --- | --- | --- | --- |
| Comparative Example 1 | 3505 | 20% | 30 |
| Inventive Example 1 | 5300 | 10% | 100 |

Comparative Example 1 of Table 1 relates to the multilayer ceramic capacitor using a spherical barium titanate powder having a particle size of about 100 nm as a base powder, whereas Inventive Example 1 relates to a multilayer ceramic capacitor using a barium titanate powder as a base powder, in which the length of the vertical axis of the barium titanate is controlled to be about 20 nm, the length of the major axis is controlled to be about 200 nm, and the length of the minor axis is controlled to be about 100 nm.

As shown in the above Table 1, the permittivity of Inventive Example 1 was even higher than that of Comparative Example 1 and the change rate of capacity was also reduced to half of that of Comparative Example 1. In addition, it could be seen that Inventive Example 1 greatly improved the break-down voltage (BDV) and therefore the reliability of the MLCC was greatly improved.

On the other hand, if the ratio of the length of the major axis 12b of the dielectric grain and the vertical axis 12a of the dielectric grain is greater than or equal to 2, the dielectric grain may be preferably included in one dielectric sheet in an amount of 10 vol % or greater.

Further, if the ratio of the length of the major axis 12b of the dielectric grain to the vertical axis 12a of the dielectric grain is equal to or greater than 3, the dielectric grain may be included in an amount of 3 vol % or greater. If the dielectric grain having the ratio of the length that is greater than or equal to 3 is included in an amount less than 3 vol %, there is a limitation in sufficiently exhibiting the permittivity, the DC-bias, and the BVD characteristics of Inventive Example 1 shown in the above Table 1.

Further, if the ratio of the length of the major axis 12b of the dielectric grain to the vertical axis 12a of the dielectric grain is equal to or greater than 10, the dielectric grain may be included in one dielectric sheet in an amount of 0.1 vol % or greater. Here, the dielectric grain having the ratio of the length greater than or equal to 10 is included in an amount of 0.1 vol % or greater, such that the size of the dielectric grain may be increased and the thinness effect may be greatly exhibited.

On the other hand, although not shown, the number of grains aligned along the minor axis in each dielectric sheet may be within a range from 2 to 20 on average. If the number of grains is smaller than two on average, the sufficient number of dielectric grains are not included and therefore the required level of capacity may not be implemented or the DC-bias characteristics may be insufficient and if the number of grains is larger than 20 on average, the average area on the plane of the grain configured of the major axis and the minor axis is excessively narrow, such that the high permittivity characteristics may hardly be implemented like the case in which the dielectric grain is not sufficiently formed.

Further, dielectric grains in each dielectric sheet may be stacked in 2 to 20 on average along the vertical axis direction. This may mean that the typical dielectric grains existing in a spherical or regular hexagonal shape using the existing spherical dielectric powder are stacked along the stacking direction more than about two to four grains in each dielectric sheet. If the dielectric grains are stacked in 2 to 20 on average along the vertical axis direction, the thickness of the dielectric grain is made thinner than the area of the dielectric grain, such that the dielectric grain may not be restricted by the electric field and the permittivity may not be reduced even at a high electric field.

Although not specifically shown, the shapes of the dielectric grains included in the dielectric sheet may be different from each other and if the dielectric grains satisfying the requirements of the above numerical range are included, they may be included in the multilayer electronic component according to an exemplary embodiment in the present disclosure.

As set forth above, according to exemplary embodiments in the present disclosure, the dielectric composition having a high permittivity and the multilayer ceramic capacitor having the same may be provided.

While exemplary embodiments have been shown and described above, it will be apparent to those skilled in the art that modifications and variations could be made without departing from the scope of the present invention as defined by the appended claims.

What is claimed is:

1. A dielectric composition, wherein the dielectric composition is a barium titanate-based dielectric composition, and includes a particle including a major axis, a minor axis disposed on the same plane as the major axis, and a vertical axis perpendicular to both the major axis and the minor axis and having a ratio of a length of the major axis to a length of the vertical axis that ranges from 1.5:1 or greater to 30:1 or less, and
    wherein a length of the minor axis is within a range from 20 nm to 500 nm.

2. The dielectric composition of claim 1, wherein a ratio of the length of the major axis to a length of the minor axis is within a range from 1:1 to 30:1.

3. The dielectric composition of claim 1, wherein the length of the major axis is within a range from 50 nm to 2000 nm.

4. The dielectric composition of claim 1, wherein the length of the vertical axis is within a range from 10 nm to 200 nm.

5. The dielectric composition of claim 1, wherein the particle has a plate shape.

6. The dielectric composition of claim 1, wherein the particle has a ribbon shape.

7. A multilayer ceramic capacitor, comprising:
    a body including a plurality of stacked dielectric sheets; and
    external electrodes disposed on an outer surface of the body,
    wherein each of the plurality of dielectric sheets in the body includes a dielectric grain of a dielectric composition,
    the dielectric grain includes a major axis, a minor axis disposed on the same plane as the major axis, and a vertical axis perpendicular to both the major axis and the minor axis,
    a ratio of a length of the vertical axis to a length of the major axis is within a range from 2:1 to 100:1, and
    the body further includes an internal electrode printed on each of the plurality of dielectric sheets, and the vertical axis of the dielectric grain is disposed to be parallel with the thickness direction of the internal electrode.

8. The multilayer ceramic capacitor of claim 7, wherein the length of the vertical axis is equal to or less than 100 nm.

9. The multilayer ceramic capacitor of claim 7, wherein the ratio of the length of the vertical axis to the length of the major axis in the entire area of the dielectric grain included in each dielectric sheet is greater than or equal to 2:1, and
    the dielectric grain is included as 10 area % or greater.

10. The multilayer ceramic capacitor of claim 7, wherein the ratio of the length of the vertical axis to the length of the major axis in the entire area of the dielectric grain included in each dielectric sheet is greater than or equal to 3:1, and
    the dielectric grain is included as 3 area % or more.

11. The multilayer ceramic capacitor of claim 7, wherein the ratio of the length of the vertical axis to the length of the major axis in the entire area of the dielectric grain included in each dielectric sheet is greater than or equal to 10:1, and
    the dielectric grain is included as 0.1 area % or more.

12. The multilayer ceramic capacitor of claim 7, wherein the number of grains aligned along the minor axis in each of the plurality of dielectric sheets ranges from 2 to 20.

13. The multilayer ceramic capacitor of claim 7, wherein the dielectric grain in each of the plurality of dielectric sheets are stacked in a number of 2 to 20 on average, along a vertical axis direction.

14. The multilayer ceramic capacitor of claim 7, wherein a length of the minor axis is within a range from 20 nm to 500 nm.

15. The multilayer ceramic capacitor of claim 7, wherein the length of the major axis is within a range from 50 nm to 2000 nm.

16. The multilayer ceramic capacitor of claim 7, wherein the length of the vertical axis is within a range from 10 nm to 200 nm.

* * * * *